United States Patent
Wang et al.

(10) Patent No.: US 10,870,136 B2
(45) Date of Patent: Dec. 22, 2020

(54) CLEANING DEVICE, CLEANING APPARATUS AND CLEANING METHOD

(71) Applicants: BOE TECHNOLOGY GROUP CO., LTD., Beijing (CN); CHENGDU BOE OPTOELECTRONICS TECHNOLOGY CO., LTD., Chengdu (CN)

(72) Inventors: Xiangnan Wang, Beijing (CN); Xuequan Jin, Beijing (CN); Qiang Wen, Beijing (CN); Jianjun Tan, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu (CN)

( * ) Notice: Subject to any disclaimer, the term of this patent is extended or adjusted under 35 U.S.C. 154(b) by 91 days.

(21) Appl. No.: 15/949,371

(22) Filed: Apr. 10, 2018

(65) Prior Publication Data

US 2019/0030573 A1  Jan. 31, 2019

(30) Foreign Application Priority Data

Jul. 31, 2017 (CN) .......................... 2017 1 0639518

(51) Int. Cl.
*B08B 3/04* (2006.01)
*G02B 27/00* (2006.01)
(Continued)

(52) U.S. Cl.
CPC .............. *B08B 3/041* (2013.01); *A46B 13/00* (2013.01); *B08B 1/002* (2013.01); *B08B 1/006* (2013.01);
(Continued)

(58) Field of Classification Search
None
See application file for complete search history.

(56) References Cited

U.S. PATENT DOCUMENTS 5,745,945 A * 5/1998 Manfredi ................ B08B 1/007
15/21.1
9,643,215 B2   5/2017 Lee et al.
(Continued)

FOREIGN PATENT DOCUMENTS

CN    103658072 A    3/2014
CN    205223609 U    5/2016
(Continued)

OTHER PUBLICATIONS

Office Action dated Feb. 2, 2019 issued in corresponding Chinese Application No. 201710639518.3.

*Primary Examiner* — Michael E Barr
*Assistant Examiner* — Jason P Riggleman
(74) *Attorney, Agent, or Firm* — Nath, Goldberg & Meyer; Joshua B. Goldberg

(57) ABSTRACT

The present disclosure provides a cleaning device, cleaning apparatus and cleaning method. The cleaning device including a cleaning portion and at least one liquid amount control portion, the cleaning portion includes a cleaning surface which is capable of absorbing a cleaning liquid for cleaning an object to be cleaned; and the at least one liquid amount control portion is configured to be able to contact the cleaning surface and apply a contact pressure to the cleaning surface, so as to control a amount of the cleaning liquid contained in the cleaning surface of the cleaning portion as a generally determined value when in contact with the object to be cleaned.

10 Claims, 4 Drawing Sheets

(51) Int. Cl.
*A46B 13/00* (2006.01)
*B08B 1/00* (2006.01)
*B08B 1/02* (2006.01)
*B08B 1/04* (2006.01)
*G02F 1/13* (2006.01)

(52) U.S. Cl.
CPC ............... *B08B 1/02* (2013.01); *B08B 1/04* (2013.01); *G02B 27/0006* (2013.01); *A46B 13/001* (2013.01); *G02F 2001/1316* (2013.01)

(56) References Cited

U.S. PATENT DOCUMENTS

2011/0094537 A1* 4/2011 Ko .......................... B08B 1/007
 134/6
2014/0075690 A1* 3/2014 Lee .................. H01L 21/67051
 15/77

FOREIGN PATENT DOCUMENTS

CN 205270195 * 6/2016
CN 205270195 U 6/2016

\* cited by examiner

CLEANING DEVICE, CLEANING APPARATUS AND CLEANING METHOD

CROSS-REFERENCE TO RELATED APPLICATION

This application claims the priority of China Patent Application No. 201710639518.3, filed in China on Jul. 31, 2017, the entire contents of which are hereby incorporated by reference.

TECHNICAL FIELD

The present disclosure relates to a cleaning device, a cleaning apparatus, and a cleaning method.

BACKGROUND

In the manufacturing process of the display device, a main purpose of cleaning the substrate or the panel is to remove contaminants such as impurities, surface films (natural oxide films and surface absorbing materials) adhered to the surface thereof, and prevent display defects due to these contaminants. The second purpose is to make the surface of the substrate smoother so as to successfully manufacture the components disposed on the substrate, thereby improving the production efficiency and the reliability of the display device. Due to the high requirement for cleanliness, different cleaning methods are generally used for different types of contaminants, and a special cleaning device is used to clean substrates and the like.

For example, taking cleaning substrate as an example, some inorganic substances, organic substances, and surface films on the surface of the substrate are usually removed by a chemical solution cleaning method or the like. For the contaminants that are adhered to the surface of the substrate and cannot be removed by spray cleaning or chemical solution cleaning, the current common cleaning method is to use a special cleaning device to perform cleaning by mechanically rubbing the substrate.

SUMMARY

At least one embodiment of the present disclosure discloses a cleaning device including a cleaning portion and at least one liquid amount control portion, wherein the cleaning portion includes a cleaning surface which is capable of absorbing a cleaning liquid for cleaning an object to be cleaned; and the at least one liquid amount control portion is configured to be able to contact the cleaning surface and apply a contact pressure to the cleaning surface, so as to control an amount of the cleaning liquid contained in the cleaning surface of the cleaning portion as a generally determined value when the cleaning surface is in contact with the object to be cleaned.

Optionally, the liquid amount control portion is configured to be movable to adjust a relative position between the liquid amount control portion and the cleaning surface.

Optionally, the cleaning portion is configured to be movable to adjust a relative position between the cleaning surface and the liquid amount control portion.

Optionally, the liquid amount control portion is configured to contact the object to be cleaned and be able to transmit the object to be cleaned by rotation.

Optionally, the liquid amount control portion includes a roller or a strip plate.

Optionally, the cleaning surface includes a water-absorbing material selected from the group consisting of a cloth, a brush, and a sponge.

Optionally, the cleaning portion includes a cleaning roller and the cleaning roller is configured to be rotatable for a cleaning operation.

Optionally, the liquid amount control portion is provided to extend in an axial direction of the cleaning roller.

Optionally, a length of the liquid amount control portion in the axial direction of the cleaning roller is the same as an axial length of the cleaning roller.

Optionally, the liquid amount control portions are disposed on a front side and a rear side of a position of the cleaning portion where the cleaning surface is in contact with the object to be cleaned in a rotational direction of the cleaning portion.

At least one embodiment of the present disclosure discloses a cleaning apparatus including a cleaning device mentioned above.

Optionally, the cleaning apparatus further includes: a cleaning table for placing an object to be cleaned; and a conveying device, which is configured to be able to convey the object to be cleaned on the cleaning table so that the object to be cleaned is transmitted over the cleaning device for cleaning.

Optionally, the cleaning apparatus further includes: a cleaning tank for holding a cleaning liquid; wherein a cleaning portion of the cleaning device is disposed in the cleaning tank.

At least one embodiment of the present disclosure discloses a cleaning method, which is applicable to a cleaning apparatus mentioned above, including: providing an object to be cleaned on a cleaning table; making at least part of a cleaning surface to absorb a cleaning liquid; and cleaning the object to be cleaned after the cleaning surface absorbed with the cleaning liquid is applied with a pressure by a liquid amount control portion.

Optionally, cleaning method further includes adjusting a contact pressure between a cleaning portion and the liquid amount control portion when they are in contact before a cleaning operation is performed; adjusting a speed of relative movement of the cleaning surface in the cleaning operation relative to the object to be cleaned; and moving the object to be cleaned on the cleaning table so that a part of the object to be cleaned in contact with the cleaning surface during movement is cleaned.

BRIEF DESCRIPTION OF THE DRAWINGS

In order to more clearly explain the technical solutions of the embodiments of the present disclosure, the drawings of the embodiments will be briefly described below. It is obvious that the drawings in the following description merely involve some embodiments of the present disclosure and do not limit the present disclosure.

DETAILED DESCRIPTION OF THE EMBODIMENTS

Figure 1:
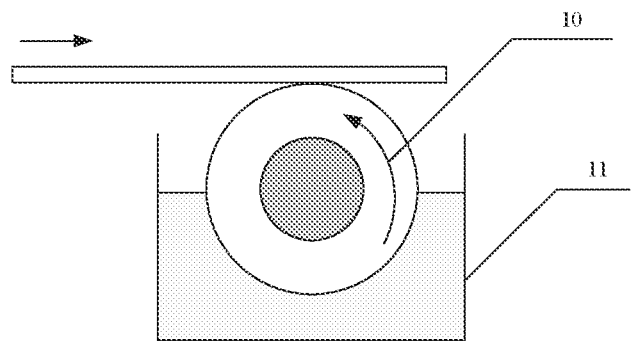
FIG. 1 is a front view of a cleaning device along with an object to be cleaned.

To make the objectives, technical solutions, and advantages of the embodiments of the present disclosure more clear, the following clearly describes the technical solutions of the embodiments of the present disclosure with reference to the accompanying drawings of the embodiments of the present disclosure. Obviously, the described embodiments are a part of the embodiments of the present disclosure but not all embodiments. All other embodiments obtained by a skilled person in the art based on the embodiments described in the present disclosure without any creative efforts shall fall within the protection scope of the present disclosure.

Unless defined otherwise, technical terms or scientific terms used herein should be commonly understood by ordinary skilled person in the art to which this disclosure belongs. The use of "first", "second" and the like in the description and claims of the present disclosure does not denote any order, quantity, or importance, but rather merely serves to distinguish between different components. The use of "including" or "comprising" and the like means that a component or item preceding the word encompasses the element or item listed after the word and its equivalent, without excluding other components or items. "Inner", "outside" and the like are only used to indicate relative positional relationship. When the absolute position of the object being described is changed, the relative positional relationship may also be changed accordingly.

The dimensions of the drawings used in the present disclosure are not drawn strictly in actual scale. Only the components of the cleaning device related to the technical features of the present disclosure are shown in the drawings. Other components may refer to the conventional design in the art. The drawings described herein are merely structural diagrams.

For convenience, a first side of a cleaning portion in the present disclosure refers to the right side of the cleaning portion shown in the drawings of the present disclosure, and a second side of the cleaning portion refers to the left side of the cleaning portion shown in the drawings of the present disclosure. For example, an object to be cleaned in the present disclosure may be a component in a manufacturing process of a display device, such as a substrate or the like for manufacturing a display device, or may be a product such as a display panel or the like.

FIG. 1 is a schematic view of a cleaning device for cleaning a substrate, a display panel, and the like. As shown in FIG. 1, a roller brush 10 is disposed in a cleaning tank 11. When the cleaning device is working, the cleaning tank 11 contains a cleaning liquid, and a part of the surface of the roller brush 10 is immersed in the cleaning liquid. An object to be cleaned is placed above the roller brush 10 and moves horizontally to the right in a direction of the straight arrow as shown in FIG. 1. The roller brush 10 can be rotated in a counterclockwise direction, and the surface of the roller brush 10 is in contact with the object to be cleaned after absorbing the cleaning liquid, so as to clean the object to be cleaned by mechanical friction. However, in this cleaning method, the amount of the cleaning liquid absorbed by the roller brush 10 may be inconsistent each time, resulting in a large change in the cleaning effect, and the cleaning effect between different batches may vary greatly. Also, since the amount of liquid absorption is not the same, the driving force required for rotation is not uniform each time, resulting a large wear on a driving device. In addition, during the cleaning process, if the cleaning liquid is too much, the cleaning liquid splashed by the roller brush will sputter on the surface of the object to be cleaned (including the surface that has been cleaned), the surface that has been cleaned is contaminated and cleaning effect is reduced.

At least one embodiment of the present disclosure provides a cleaning device including a cleaning portion and at least one liquid amount control portion. The cleaning portion includes a cleaning surface which is capable of absorbing a cleaning liquid for cleaning an object to be cleaned. The at least one liquid amount control portion is configured to be able to contact the cleaning surface and apply a contact pressure to the cleaning surface, so as to control an amount of the cleaning liquid contained in the cleaning surface of the cleaning portion as a generally determined value when the cleaning surface is in contact with the object to be cleaned.

At least one embodiment of the present disclosure also provides a cleaning apparatus including the above cleaning device.

At least one embodiment of the present disclosure also provides a cleaning method, which is applicable to the above cleaning apparatus. The method includes: providing an object to be cleaned on a cleaning table; making at least a part of a cleaning surface to absorb a cleaning liquid; cleaning the object to be cleaned by the cleaning surface in which the cleaning liquid is absorbed after a pressure is applied to the cleaning surface by a liquid amount control portion.

The concept of the present disclosure will be described in detail below by several specific embodiments.

Embodiment 1

Figure 2A:
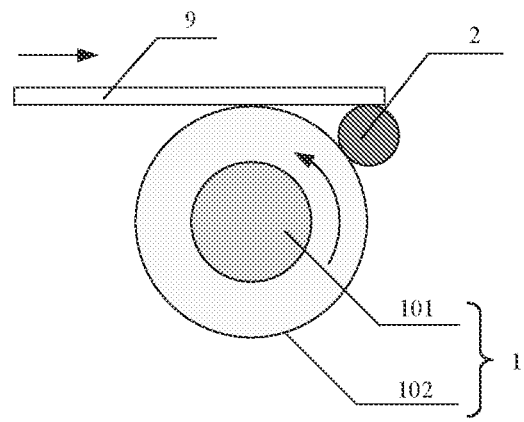
FIG. 2A is a front view of a cleaning device provided in an embodiment of the present disclosure along with an object to be cleaned.
Figure 2B:
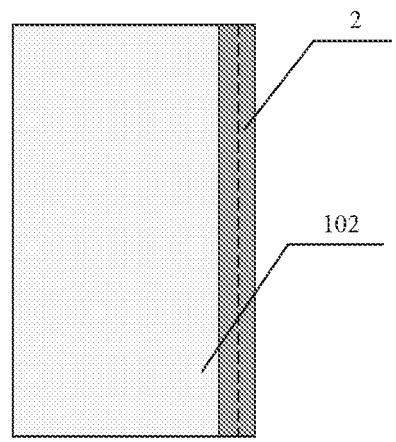
FIG. 2B is a top view of a cleaning device provided in an embodiment of the present disclosure.
Figure 3A:
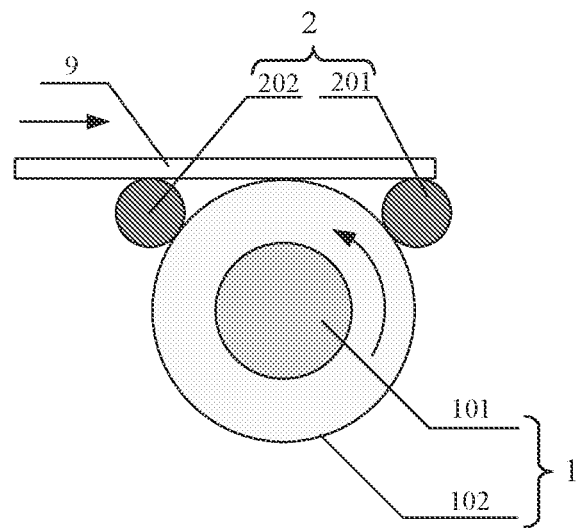
FIG. 3A is a front view of another cleaning device provided in an embodiment of the present disclosure along with an object to be cleaned.
Figure 3B:
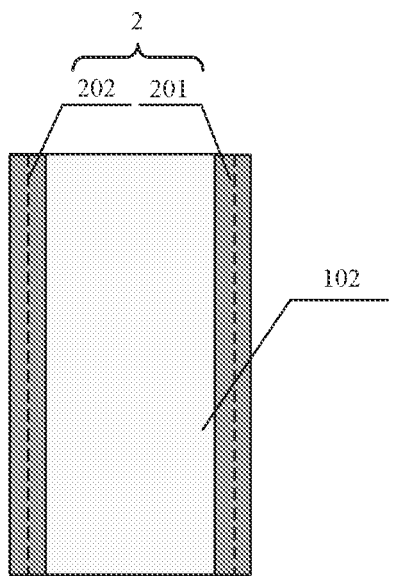
FIG. 3B is a top view of another cleaning device provided in an embodiment of the present disclosure.
Figure 4A:
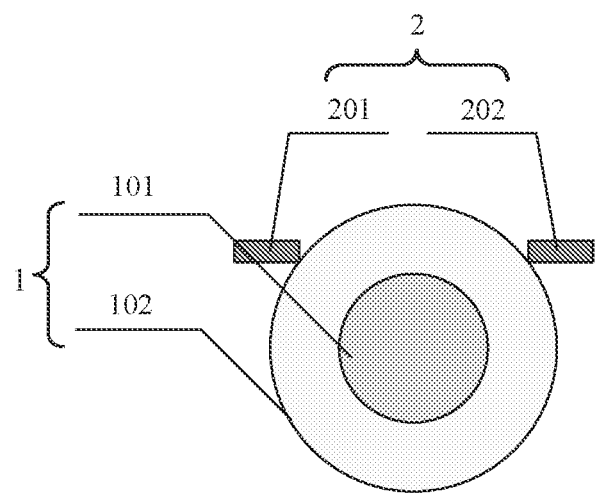
FIG. 4A is a front view of yet another cleaning device provided in an embodiment of the present disclosure.
Figure 4B:
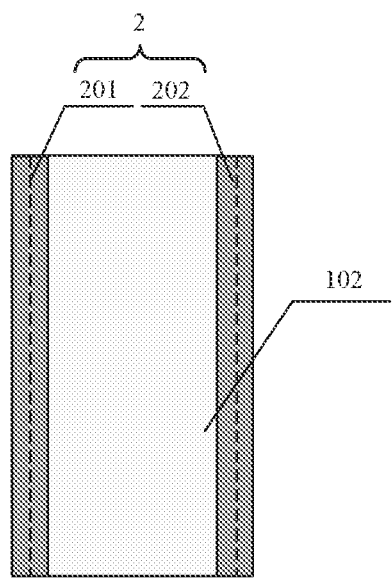
FIG. 4B is a top view of yet another cleaning device provided in an embodiment of the present disclosure.
Figure 5:
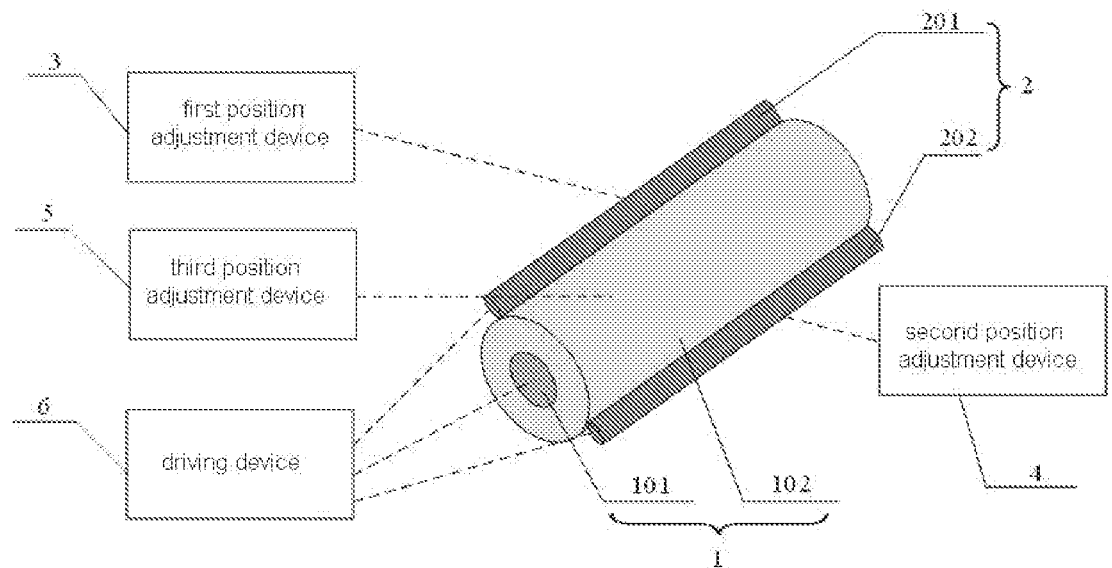
FIG. 5 is a schematic structural diagram of a cleaning device provided in an embodiment of the present disclosure.

FIG. 2A is a front view of a cleaning device provided in an embodiment along with an object to be cleaned. FIG. 2B is a top view of a cleaning device provided in an embodiment. FIG. 3A is a front view of another cleaning device provided in an embodiment along with an object to be cleaned. FIG. 3B is a top view of another cleaning device provided in an embodiment. FIG. 4A is a front view of yet another cleaning device provided in an embodiment. FIG. 4B is a top view of yet another cleaning device provided in an embodiment. FIG. 5 is a schematic structural diagram of a cleaning device provided in an embodiment.

The present embodiment provides a cleaning device including a cleaning portion and at least one liquid amount control portion. The cleaning portion includes a cleaning surface which is capable of absorbing a cleaning liquid for cleaning an object to be cleaned. The at least one liquid amount control portion is configured to be able to contact the cleaning surface and apply a contact pressure to the cleaning surface, so as to control the amount of the cleaning liquid contained in the cleaning surface of the cleaning portion as a generally determined value when the cleaning surface is in contact with the object to be cleaned. The cleaning device can be used to clean a substrate, a panel or the like in the manufacturing process of a display device.

For example, the cleaning portion may include a brushing device such as a cleaning roller. In this embodiment, the technical solution of the present disclosure will be described by taking the cleaning portion as a cleaning roller as an example, but it is not a limitation to the embodiments of the present disclosure.

In the example shown in FIG. 2A and FIG. 2B, the cleaning device includes a cleaning portion 1 and a liquid amount control portion 2. The cleaning portion 1 includes a roller shaft 101 and a cleaning layer wrapped outside the roller shaft 101, and the cleaning layer includes a cleaning surface 102. For example, an object to be cleaned can be placed above the cleaning device. When the cleaning device is operated, the roller shaft 101 is configured to be rotatable and drive the cleaning surface 102 to rotate in the same direction, so as to frictionally clean the object to be cleaned. The cleaning surface 102 can absorb the cleaning liquid for cleaning the object to be cleaned.

Optionally, as shown in FIG. 2A, the liquid amount control portion 2 is disposed on a first side (the right side of the cleaning portion 1 as shown in FIG. 2A) of the cleaning portion 1, and is configured to be able to contact the cleaning surface 102 and apply a contact pressure to the cleaning surface 102, so as to control the amount of the cleaning liquid contained in the cleaning surface when the cleaning surface is in contact with an object to be cleaned. For example, a portion of the cleaning surface 102 below the liquid amount control portion 2 absorbs the cleaning liquid and then rotates through the liquid amount control portion 2. After the liquid amount control portion 2 presses the cleaning surface 102 in contact therewith, the cleaning surface 102 continues to rotate till it is contact with the object to be cleaned to operate cleaning. When the liquid amount control portion 2 applies a certain pressure to the cleaning surface 102, the liquid amount of the cleaning surface 102 after the cleaning surface 102 is pressurized by the liquid amount control portion 2 is constant. In this way, the amount of the cleaning liquid contained in the cleaning surface 102 can be kept constant each time, the stability of the cleaning effect can be increased, the difference in the cleaning effect between different batches of the objects to be cleaned can be reduced. Further, the inconsistency of driving forces required to rotate the cleaning portion each time due to the difference in the amount of liquid absorbed by the cleaning surface can be avoided, thereby reducing damage to the drive device.

There are various methods for enabling the cleaning surface 102 to absorb the cleaning liquid. For example, an external spray device may be used to spray the cleaning liquid to the cleaning surface 102, or a portion of the cleaning surface 102 located below the liquid amount control portion 2 may be soaked in the cleaning liquid.

Optionally, the cleaning surface 102 may include a water-absorbing material such as a cloth (e.g., flannelette), a brush or a sponge, and may absorb a certain amount of liquid, and may change the liquid-absorbing amount after being subjected to a pressure applied by the liquid amount control portion 2. Definitely, the material of the cleaning surface 102 is not limited to the categories mentioned above.

Optionally, the liquid amount control portion 2 may be provided to extend in an axial direction of the cleaning portion 1 (cleaning roller), so that the liquid amount control portion 2 can be uniformly brought into contact with the cleaning surface 102 of the cleaning portion 1 in the axial direction, so as to apply an uniform pressure to the cleaning surface 102 along the axial direction. Compared to other arrangements, the volume of the liquid amount control portion 2 can be saved, which facilitates the simplification of the structure of the cleaning device.

Optionally, the length of the liquid amount control portion 2 in the axial direction of the cleaning roller may be the same as the axial length of the cleaning roller of the cleaning portion 1. In this way, the liquid amount control portion 2 can be brought into contact with each portion of the cleaning surface 102 in the axial direction, and an uniform pressure can be applied to each portion of the cleaning surface, thereby facilitating control for the consistency of the amount of cleaning liquid in each portion of the cleaning surface 102, and achieving a consistent cleaning effect at various location of the object to be cleaned.

It should be noted that in the above example, the liquid amount control portion 2 is provided on a first side (the right side of the cleaning portion 1 as shown in FIG. 2A) of the cleaning portion 1, and the cleaning surface 102 rotates in a counterclockwise direction as shown in FIG. 2A. However, the present disclosure is not limited to such an arrangement. For example, when the cleaning surface 102 is rotated clockwise, the liquid amount control portion 2 may be provided on a second side (the left side of the cleaning portion as shown in FIG. 2A) of the cleaning portion 1. As long as the cleaning surface 102 absorbing the cleaning liquid firstly can be pressed by the liquid amount control portion 2, and then contacting the object to be cleaned to perform cleaning operation. The liquid amount control portion 2 is disposed on a front side (upstream side) of a position of the cleaning portion 1 where the cleaning surface 102 of the cleaning portion 1 is in contact with the object to be cleaned in the rotational direction of the cleaning portion 1. In other words, the liquid amount control portion 2 is provided to be in pressure contact with the cleaning portion 1 before the cleaning portion 1 comes into contact with the object to be cleaned, so as to control the liquid amount of the cleaning portion 1.

Optionally, the liquid amount control portion 2 may be provided on both the first side and the second side of the cleaning portion 1. As shown in FIG. 3A and FIG. 3B, this cleaning device is different from the example shown in FIG. 2A and FIG. 2B, in that this cleaning device includes two liquid amount control portions 2, respectively i.e. a first liquid amount control portion 201 disposed on the first side of the cleaning portion 1 and a second liquid amount control portion 202 disposed on the second side of the cleaning portion 1, respectively. The two liquid amount control portions 201 and 202 are disposed on a front side and a rear side of a position of the cleaning portion 1 where the cleaning surface 102 of the cleaning portion 1 is in contact with the object to be cleaned in the rotational direction of the cleaning portion 1, respectively. In this way, the liquid amount control portion 2 can further maintain a uniform amount of cleaning liquid contained in the cleaning surface 102 and can also block the liquid splashed or thrown off due to the rotation of the cleaning portion 1, so as to prevent the liquid from splashing on the surface that has been cleaned, and avoid secondary contamination to the cleaned surface.

It should be noted that in the above example, the dimensions of the cleaning portion 1 and the liquid amount control portion 2 can be determined according to a dimension range of the object to be cleaned. The axial length of the cleaning portion 1 and the liquid amount control portion 2 is greater than or equal to the maximum length of the object to be cleaned in the axial direction of the cleaning portion 1. If the length of the object to be cleaned in the conveying direction is large, the radial dimension of the cleaning portion 1 can be appropriately increased; and if the length of the object to be cleaned in the conveying direction is small, the radial dimension of the cleaning portion 1 is appropriately reduced. For example, when the radial dimension of the cleaning roller is 90 mm, the radial dimension of the liquid amount control portion 2 may be 12.7 mm. Definitely, it is only an exemplary dimension which is not specifically limited in this embodiment, and can be determined by those skilled in the art according to actual needs.

For example, the liquid amount control portion 2 may be a roller as shown in FIG. 2A-FIG. 3B, or a strip plate as shown in FIG. 4A and FIG. 4B, or other shapes which is capable of achieving above functions. The embodiment does not limit a specific shape of the liquid amount control portion 2, and those skilled in the art can select and design the shape considering ease of use.

In the following, the cleaning device includes two fluid amount control portions 2 and two fluid amount control portions 2 are rollers as an example, and its configuration and working principle will be described in more detail.

As shown in FIG. 5, the cleaning portion 1 is configured to be rotatable for performing a cleaning operation. For example, a roller shaft 101 of the cleaning portion 1 is connected with a driving device. The roller shaft 101 is driven to rotate, so as to drive the cleaning surface 102 to rotate. For example, an electric motor drives the roller shaft 101 to rotate at a high speed so that the cleaning surface 102 rubs the object to be cleaned which is placed above the cleaning portion 1 for cleaning.

Optionally, the liquid amount control portion 2 may also be configured to be movable to adjust a relative position between the liquid amount control portion 2 and the cleaning surface 102. For example, a first liquid amount control portion 201 and a second liquid amount control portion 202 may include a first roller shaft and a second roller shaft respectively, and an outer layer enclosing the first roller shaft and the second roller shaft, respectively. For example, both ends of the first roller shaft may be connected with a first position adjustment device 3, and both ends of the second roller shaft may be connected with a second position adjustment device 4. The positions of the first liquid amount control portion 201 and the second liquid amount control portion 202 may be adjusted by adjusting the first position adjustment device 3 and the second position adjustment device 4. Optionally, the above adjustment could be performed by a manual adjustment or an automatic control such as electric control. For example, the first position adjustment device 3 and the second position adjustment device 4 may be a supporting device with a position adjustment member, which can perform position adjustment in four directions (up, down, left, and right) to stably support the first liquid amount control portion 201 and the second liquid amount control portion 202. At the same time, the positions of both the first liquid amount control portion 201 and the second liquid amount control portion 202 may be adjusted as necessary to adjust the relative positions between the first and second liquid amount control portions 201, 202 and the cleaning surface 102. Thus, the size of the contact pressure applied to the cleaning surface 102 by the first liquid amount control portion 201 and the second liquid amount control portion 202 can be changed, and the effect of controlling the amount of the cleaning liquid contained in the cleaning surface 102 as necessary can be achieved.

Optionally, the cleaning portion 1 is configured to be movable to adjust a relative position between the cleaning surface 102 and the liquid amount control portion 2. For example, both ends of a roller shaft of the cleaning portion 1 may be connected with a third position adjustment device 5 respectively. The position of the cleaning portion 1 may be adjusted by adjusting the third position adjustment device 5, for example, the third position adjustment device 5 may be movable in a vertical direction. The third position adjustment device 5 may be a telescopic lifting device. The cleaning portion 1 can be supported while the height of the cleaning portion 1 may be changed by lifting. For example, the lifting movement of the telescopic lifting device can be adjusted manually or electrically. The third position adjustment device 5 can also be a hydraulic adjustment device to achieve an adjustment to the height of the cleaning portion 1. Since the cleaning portion 1 can also be movable to change the relative position between the cleaning portion 1 and the liquid amount control portion 2, it is possible to overcome the limitation that the relative position between the cleaning portion 1 and the liquid amount control portion 2 can be changed only by adjusting the position of the liquid amount control portion 2. It is possible to more flexibly change the relative position between those two and the size of the contact pressure applied to the cleaning surface 102 by the liquid amount control portion 2 as necessary, so that the amount of the cleaning liquid contained in the cleaning surface 102 can be controlled.

Optionally, the liquid amount control portion 2 can contact the object to be cleaned and is configured to be able to transmit the object to be cleaned by rotation. For example, the first roller shaft and the second roller shaft may be connected to a driving device. The first liquid amount control portion 201 and the second liquid amount control portion 202 can be driven to rotate by rotation of the first roller shaft and the second roller shaft. By adjusting the rotation direction and the rotational speed of the roller shafts, a relative movement direction and speed with respect to the cleaning portion 1 can be controlled. The first liquid amount control portion 201 and the second liquid amount control portion 202 are adjusted to a position that can contact the object to be cleaned, for example, above the cleaning portion 1 as shown in FIG. 2A and FIG. 3A, so that the transmission of the object to be cleaned is achieved. The driving device of the liquid amount control portion 2 may be controlled separately from that of the cleaning portion 1 but using a same driving device. Alternatively, a driving device may be separately provided to the liquid amount control portion 2.

It should be noted that the above driving device can be adopted in various driving means, such as electrical driving, hydraulic driving or a combination of multiple driving. For example, the driving device may include an electric motor and its associated high-speed shaft coupling, speed reducer or low-speed shaft coupling, etc. Regarding the specific configuration and connection mode of the driving device, this embodiment is not limited and those skilled in the art can choose a reasonable driving mode and connection mode according to the conventional design. The position adjustment device and its connection position and connection manner described above are not limited to the above examples, and those skilled in the art can design according to actual needs.

It should be noted that the roller shaft of the cleaning roller, the first roller shaft and the second roller shaft of the liquid amount control portion may be made of a metal material such as stainless steel. The outer layer of the liquid amount control portion may be made of rubber, resin or the like. Definitely, the material of the above configuration is not limited to the above-listed species.

Embodiment 2

Figure 6:
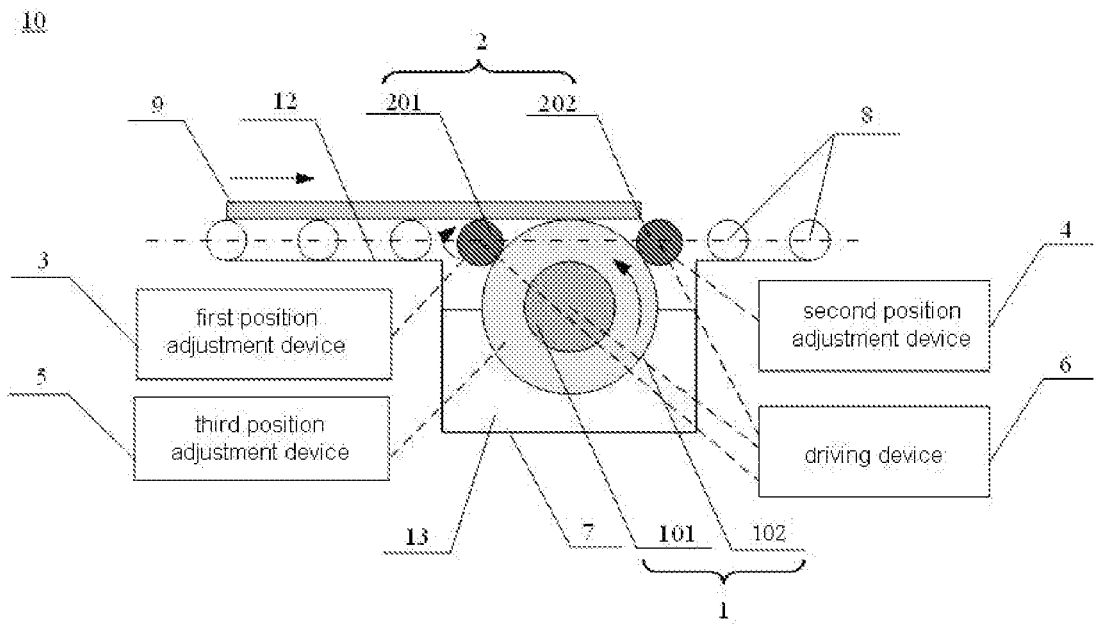
FIG. 6 is a front view of a cleaning apparatus provided in an embodiment of the present disclosure along with an object to be cleaned.

FIG. 6 is a front view of a cleaning apparatus provided in this embodiment.

This embodiment provides a cleaning apparatus including any of the above cleaning devices. The cleaning device can be used to clean a substrate, a panel or the like in the manufacturing process of a display device.

Taking a cleaning apparatus including the cleaning device as shown in FIG. 5 as an example, as shown in FIG. 6, the cleaning apparatus further includes a cleaning table 12 for placing an object 9 to be cleaned and a conveying device 8 disposed on the cleaning table 12. The conveying device 8 is configured to be able to convey the object 9 to be cleaned on the cleaning table 12 so that the object 9 to be cleaned is transmitted over the cleaning device for cleaning. For example, the conveying device 8 may be a transport roller as shown in FIG. 6, and in other examples, it may be a conveying device such as a conveyor belt. If the conveying direction of the conveying device 8 is the straight arrow direction as shown in FIG. 6, the cleaning portion 1 may be driven to rotate in a counterclockwise direction as shown in FIG. 6. Therefore, so that the cleaning surface 102 and the object 9 to be cleaned can be moved in an opposite direction to each other at the location where they are in contact with each other, and so as to achieve a better cleaning effect can be achieved.

For example, the cleaning apparatus further includes a cleaning tank 7 for holding the cleaning liquid 13, wherein the cleaning portion is disposed in the cleaning tank 7. When the cleaning operation is performed, the cleaning liquid 13 may be added in the cleaning tank 7, and the cleaning liquid 13 may be an inorganic or organic cleaning liquid, such as deionized water, acetone, etc., so that a part of the cleaning surface 102 under the liquid amount control portion 2 is partially immersed in the cleaning liquid 13. Before cleaning, the respective positions and relative position of the cleaning portion 1 and the liquid amount control portion 2 are adjusted, so that the pressure applied by the liquid amount control portion 2 on the cleaning surface is constant. For example, the cleaning surface 2 may be compressed in the radial direction of the cleaning roller by 2 mm on a basis of a conventional state. However, it is not limited thereto, and a specific pressure level for a better cleaning effect can be determined by testing according to different materials of the cleaning surface and other conditions. When the cleaning device is in operation, the cleaning surface 102 soaked in the cleaning liquid 13 absorbs the cleaning liquid 13 in the cleaning tank 7 (at this time, the amount of the cleaning liquid absorbed each time is normally inconsistent), and then the cleaning surface 102 rotates in counterclockwise direction as shown in FIG. 6. Then, after being pressed by the liquid amount control portion 2, the cleaning surface 102 rotatably contact with the object 9 to be cleaned which is conveyed over the cleaning portion 1, and the object 9 to be cleaned is subjected to a friction cleaning. In this way, in the cleaning process, the liquid amount control portion 2 can maintain a generally same amount of the cleaning liquid contained in each part of the cleaning surface 102 that is in contact with the object 9 to be cleaned. Thus, a consistent cleaning effect is achieved for each location of the same batch of objects to be cleaned and for each batch of objects to be cleaned. At the same time, the liquid amount control portion 2 can block the cleaning liquid splashed or thrown off when the cleaning roller rotates, so as to prevent the cleaning liquid from splashing on the surface of the object 9 that has been cleaned, and avoid secondary contamination to the cleaned surface.

For example, by adjusting the first position adjustment device 3 and the second position adjustment device 4, the position of the liquid amount control portion 2 can be adjusted so that the liquid amount control portion 2 can contact with object 9 to be cleaned when the object 9 to be cleaned is conveyed over the cleaning device. The liquid amount control portion 2 can be driven to rotate in the clockwise direction as shown in FIG. 5. On one hand, the liquid amount control portion 2 can function to support the object 9 to be cleaned, so as to prevent a deformation of the object 9 to be cleaned during cleaning in a condition that the radial dimension of the cleaning portion 1 is large. On the other hand, the liquid amount control portion 2 can function to assist in conveying the object 9 to be cleaned, and the conveying direction of the liquid amount control portion 2 is the same as that of the conveying device 8.

In the above example, the rotational speed of the cleaning roller can be adjusted by the driving device. Before the cleaning apparatus is operated, an appropriate rotation speed of the cleaning roller can be set, and the positions of the liquid amount control portion and the cleaning roller can be adjusted so that the liquid amount control portion has an appropriate degree of pressure on the cleaning surface. Thus, the cleaning surface has a suitable amount of the cleaning liquid before performing the cleaning operation.

It should be noted that in the example as shown in FIG. 6, the cleaning roller rotates counterclockwise. In other examples of this embodiment, the cleaning roller may also be rotated clockwise. The rotational direction of the cleaning roller is determined according to the conveying direction of the object to be cleaned, so that the movement directions of the cleaning surface of the cleaning roller and the object to be cleaned are opposite at the position where they contact with each other.

In addition, the driving device as shown in FIG. 6 may be disposed inside the cleaning apparatus, or may be connected to outside the cleaning apparatus. This embodiment is not limited thereto, and those skilled in the art can design the driving device according to actual needs.

Embodiment 3

The present embodiment provides a cleaning method, which is applicable to the above-mentioned cleaning apparatus. The method includes: providing an object to be cleaned on a cleaning table; making at least part of a cleaning surface to absorb a cleaning liquid; and cleaning the object to be cleaned after the cleaning surface absorbed with the cleaning liquid is applied with a pressure by a liquid amount control portion.

Optionally, the cleaning method further includes: adjusting a contact pressure between a cleaning portion and the liquid amount control portion when they are in contact before the cleaning operation is performed; adjusting a speed of relative movement of the cleaning surface in the cleaning operation relative to the object to be cleaned; and moving the object to be cleaned on the cleaning table so that a part of the object to be cleaned in contact with the cleaning surface during movement is cleaned.

For example, for the cleaning apparatus shown in FIG. 6, before a cleaning operation is performed, the height of the cleaning portion 1, the position of the first liquid amount control portion 201 and the second liquid amount control portion 202 are set by adjusting the position adjustment device according to experiments and experiences. Therefore, the liquid amount control portion has a suitable degree of pressure applied to the cleaning surface, and the pressure applied to the cleaning surface by the liquid amount control portion 2 is constant. An appropriate rotational speed of the cleaning portion is selected with a driving device.

For example, when the cleaning apparatus is in operation, the object 9 to be cleaned is conveyed on the cleaning table 12 by the conveying device 8, and the object 9 to be cleaned is conveyed over the cleaning portion 1. The portion of the cleaning surface 102 soaked in the cleaning liquid 13 absorbs the cleaning liquid 13, and then rotates in the counterclockwise direction as shown in FIG. 6. Then, after being pressed by the liquid amount control portion 2, the cleaning surface 102 rotatably contact with the object 9 to be cleaned which is conveyed over the cleaning portion 1, and the object 9 to be cleaned is subjected to a friction cleaning. One end of the object 9 to be cleaned enters an area over the cleaning portion 1 from the second side of the cleaning portion 1. This end of the object 9 to be cleaned is firstly contacted with the cleaning surface 102 and cleaned. The object 9 to be cleaned is gradually moved in the conveying direction of the conveying device 8 until the other end of the object 9 to be cleaned is left the cleaning surface 102. The respective portions of the lower surface of the object 9 to be cleaned are sequentially contacted with the cleaning surface 102 and cleaned, and then a cleaning operation for the next object to be cleaned can be performed. In this cleaning process, the cleaning surface 102 can have a suitable constant amount of the cleaning liquid when in contact with the object to be cleaned, so that the stability of cleaning effect can be improved. The problem of unstable products resulting from the instability of each batch of cleaning effect can be avoided.

For example, before the cleaning operation is performed, the position of the liquid amount control portion 2 may be adjusted by the position adjustment device, so that the liquid amount control portion 2 can contact with the object 9 to be cleaned when the object 9 to be cleaned is conveyed over the cleaning device. The liquid amount control portion 2 can be rotated in the clockwise direction as shown in FIG. 6 by the driving device. In this process, the technical effects of the liquid amount control portion 2 refer to the descriptions in the first embodiment and the second embodiment, which will not be repeated herein.

It should be noted that, in the present embodiment, the rotational direction of the cleaning portion 1 and the rotational direction of the liquid amount control portion 2 are not limited to the state as shown in FIG. 6. It can be determined according to the conveying direction of the conveying device, as long as the above principle and technical effects can be achieved.

The above description is merely exemplary embodiments of the present disclosure and is not intended to limit the scope of the present disclosure, and the protection scope of the present disclosure is determined by the appended claims.

The invention claimed is:

1. A cleaning device including a cleaning portion and at least one liquid amount control portion, wherein the cleaning portion includes a cleaning surface which is capable of absorbing a cleaning liquid for cleaning an object to be cleaned;

the at least one liquid amount control portion is configured to be able to contact the cleaning surface and apply a contact pressure to the cleaning surface, so as to control an amount of the cleaning liquid contained in the cleaning surface of the cleaning portion as a generally determined value when the cleaning surface is in contact with the object to be cleaned, and wherein a first liquid amount control portion is configured to contact the object to be cleaned and be able to transmit the object to be cleaned by rotation.

2. The cleaning device according to claim 1, wherein the at least one liquid amount control portion includes a roller.

3. The cleaning device according to claim 1, wherein the cleaning surface includes a water-absorbing material selected from the group consisting of a cloth, a brush, and a sponge.

4. The cleaning device according to claim 1, wherein the cleaning portion includes a cleaning roller, and the cleaning roller is configured to be rotatable for a cleaning operation.

5. The cleaning device according to claim 4, wherein the at least one liquid amount control portion is provided to extend in an axial direction of the cleaning roller.

6. The cleaning device according to claim 5, wherein a length of the at least one liquid amount control portion in the axial direction of the cleaning roller is the same as an axial length of the cleaning roller.

7. The cleaning device according to claim 4, further comprising a second liquid amount control portion, wherein the first liquid amount control portion and the second liquid amount control portion are disposed on a front side and a rear side, respectively, of a position of the cleaning portion; wherein the second liquid amount control portion is configured to contact the object that has been cleaned, and be able to transmit the object that has been cleaned by rotation.

8. A cleaning apparatus including a cleaning device according to claim 1.

9. The cleaning apparatus according to claim 8, further includes:
a cleaning table for placing an object to be cleaned; and
a conveying device, which is configured to be able to convey the object to be cleaned on the cleaning table so that the object to be cleaned is transmitted over the cleaning device for cleaning.

10. The cleaning apparatus according to claim 8, further includes a cleaning tank for holding a cleaning liquid; wherein the cleaning portion of the cleaning device is disposed in the cleaning tank.

* * * * *